(12) United States Patent  (10) Patent No.: US 7,469,395 B2
Cohn et al.  (45) Date of Patent: Dec. 23, 2008

(54) WIRING OPTIMIZATIONS FOR POWER

(75) Inventors: John M. Cohn, Richmond, VT (US); Alvar A. Dean, Groton, MA (US); Amir H. Farrahi, Peekskill, NY (US); David J. Hathaway, Underhill Center, VT (US); Thomas M. Lepsic, Jeffersonville, VT (US); Jagannathan Narasimhan, Millwood, NY (US); Scott A. Tetreault, Marlborough, MA (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/952,544

(22) Filed: Dec. 7, 2007

(65) Prior Publication Data

US 2008/0074147 A1  Mar. 27, 2008

Related U.S. Application Data

(60) Continuation of application No. 11/176,712, filed on Jul. 7, 2005, now Pat. No. 7,346,875, which is a division of application No. 09/781,369, filed on Feb. 12, 2001, now Pat. No. 6,985,004.

(51) Int. Cl.
  *G06F 17/50* (2006.01)
(52) U.S. Cl. .................. 716/6; 716/2; 716/10; 716/13
(58) Field of Classification Search .................. None
  See application file for complete search history.

(56) References Cited

U.S. PATENT DOCUMENTS

| 4,943,739 | A | 7/1990 | Slaughter |
| 5,043,792 | A | 8/1991 | Adachi |
| 5,815,031 | A | 9/1998 | Tan et al. |
| 6,128,347 | A | 10/2000 | Nomura |
| 6,310,489 | B1 | 10/2001 | Yuan et al. |
| 6,600,336 | B2 | 7/2003 | Kojima |
| 6,600,339 | B2 | 7/2003 | Forbes et al. |
| 6,833,733 | B2 | 12/2004 | Tangen |

FOREIGN PATENT DOCUMENTS

| JP | 7141406 | 6/1995 |
| JP | 10-178100 | 6/1998 |

*Primary Examiner*—Leigh Marie Garbowski
(74) *Attorney, Agent, or Firm*—Schmeiser, Olsen & Watts; Richard M. Kotulak

(57) ABSTRACT

An electrical wiring structure and a computer system for designing the electrical wiring structure. The electrical wiring structure includes a wire pair. The wire pair includes a first wire and a second wire. The second wire is slated for being tri-stated. The wire pair has a same-direction switching probability $\phi_{SD}$ per clock cycle that is no less than a pre-selected minimum same-direction switching probability $\phi_{SD,MIN}$ or has an opposite-direction switching probability $\phi_{OD}$ per clock cycle that is no less than a pre-selected minimum opposite-direction switching probability $\phi_{OD,MIN}$. The first wire and the second wire satisfies at least one mathematical relationship involving $L_{COMMON}$ and $W_{SPACING}$, where $W_{SPACING}$ is defined as a spacing between the first wire and the second wire, and $L_{COMMON}$ is defined as a common run length of the first wire and the second wire.

24 Claims, 8 Drawing Sheets

US 7,469,395 B2

WIRING OPTIMIZATIONS FOR POWER

This application is a continuation application claiming priority to Ser. No. 11/176,712, filed Jul. 7, 2005, which is a divisional of U.S. Pat. No. 6,985,004, issued Jan. 10, 2006.

BACKGROUND OF THE INVENTION

1. Technical Field

The present invention relates to a method and structure for reducing power dissipation in microelectronic circuits, and more particularly for reducing coupled capacitance power dissipation.

2. Related Art

Reducing power dissipation is becoming increasingly difficult in Very Large Scale Integration (VLSI) design, due to constraints on battery life on 'low-end' consumer electronics and thermal dissipation constraints on 'high-end' servers. As microelectronics technology has been scaled downward, several device characteristics have compounded the problems of designing for lower power, including larger transistor counts, increased device leakage, higher switching speeds, and increased coupling capacitance. Thus, there is a need to reduce power dissipation in microelectronic circuits notwithstanding the device characteristics.

SUMMARY OF THE INVENTION

The present invention provides a method of designing an electrical wiring structure having a plurality of wires, said method comprising identifying at least one wire pair, said wire pair including a first wire of the plurality of wires and a second wire of the plurality of wires, said second wire already tri-stated or can be tri-stated, said wire pair having a same-direction switching probability $\phi_{SD}$ per clock cycle that is no less than a pre-selected minimum same-direction switching probability $\phi_{SD,MIN}$ or having an opposite-direction switching probability $\phi_{OD}$ per clock cycle that is no less than a pre-selected minimum opposite-direction switching probability $\phi_{OD,MIN}$, said first wire and said second wire satisfying at least one mathematical relationship, said at least one mathematical relationship involving $L_{COMMON}$ and $W_{SPACING}$, said $W_{SPACING}$ defined as a spacing between the first wire and the second wire, said $L_{COMMON}$ defined as a common run length of the first wire and the second wire.

The present invention provides a method for executing a two-wire voltage transition, comprising the steps of:

providing two wires of an electrical wire network, said two wires denoted as an A wire and a B wire, said A wire having a capacitance $C_A$, said B wire having a capacitance $C_B$, said A wire and B wire having a coupling capacitance $C_C$ between the A wire and the B wire;

tri-stating the B wire from a voltage $V_{B1}$ to a high impedance state;

after tri-stating the B wire, transitioning the A wire from a voltage $V_{A1}$ to a voltage $V_{A2}$ such that $V_{A2} \neq V_{A1}$; and after transitioning the A wire to $V_{A2}$, transitioning the B wire to a voltage $V_{B2}$ such that $V_{B2} \neq V_{B1}$.

The present invention provides an electrical wiring structure, comprising at least one wire pair, said wire pair including a first wire and a second wire, said second wire slated for being tri-stated, said wire pair having a same-direction switching probability $\phi_{SD}$ per clock cycle that is no less than a pre-selected minimum same-direction switching probability $\phi_{SD,MIN}$ or having an opposite-direction switching probability $\phi_{OD}$ per clock cycle that is no less than a pre-selected minimum opposite-direction switching probability $\phi_{OD,MIN}$, said first wire and said second wire satisfying at least one mathematical relationship, said at least one mathematical relationship involving $L_{COMMON}$ and $W_{SPACING}$, said $W_{SPACING}$ defined as a spacing between the first wire and the second wire, said $L_{COMMON}$ defined as a common run length of the first wire and the second wire.

The present invention provides an electrical wire structure, comprising two wires of a wire network, said two wires denoted as an A wire and a B wire, said A wire having a capacitance $C_A$, said B wire having a capacitance $C_B$, said A wire and B wire having a coupling capacitance $C_C$ between the A wire and the B wire, said B wire in a tri-state, said A wire transitioning from a voltage $V_{A1}$ to a voltage $V_{A2}$ such that $V_{A2} \neq V_{A1}$, said B wire having transitioned to the tri-state from a voltage $V_{B1}$, said B wire intended to be transitioned to a voltage $V_{B2}$ such that $V_{B2} \neq V_{B1}$ after the A wire has transitioned to the voltage $V_{A2}$, said transition of the A wire from the voltage $V_{A1}$ to the voltage $V_{A2}$ and of the B wire from the voltage $V_{B1}$ to the voltage $V_{B2}$ identified as a two-wire voltage transition.

The present invention provides a computer system for designing an electrical wiring structure having a plurality of wires, comprising:

a processor;

an input device coupled to the processor;

an output device coupled to the processor;

a first memory device coupled to the processor;

a second memory device coupled to the processor;

a computer code stored in the second memory device and executed by the processor; said computer code comprising an algorithm, said algorithm identifying at least one wire pair, said wire pair including a first wire of the plurality of wires and a second wire of the plurality of wires, said second wire already tri-stated or can be tri-stated, said wire pair having a same-direction switching probability $\phi_{SD}$ per clock cycle that is no less than a pre-selected minimum same-direction switching probability $\phi_{SD,MIN}$ or having an opposite-direction switching probability $\phi_{OD}$ per clock cycle that is no less than a pre-selected minimum opposite-direction switching probability $\phi_{OD,MIN}$, said first wire and said second wire satisfying at least one mathematical relationship, said at least one mathematical relationship involving $L_{COMMON}$ and $W_{SPACING}$, said $W_{SPACING}$ defined as a spacing between the first wire and the second wire, said $L_{COMMON}$ defined as a common run length of the first wire and the second wire.

The present invention provides a method and structure for reducing power dissipation in microelectronic circuits.

DETAILED DESCRIPTION OF THE INVENTION

Figure 1:
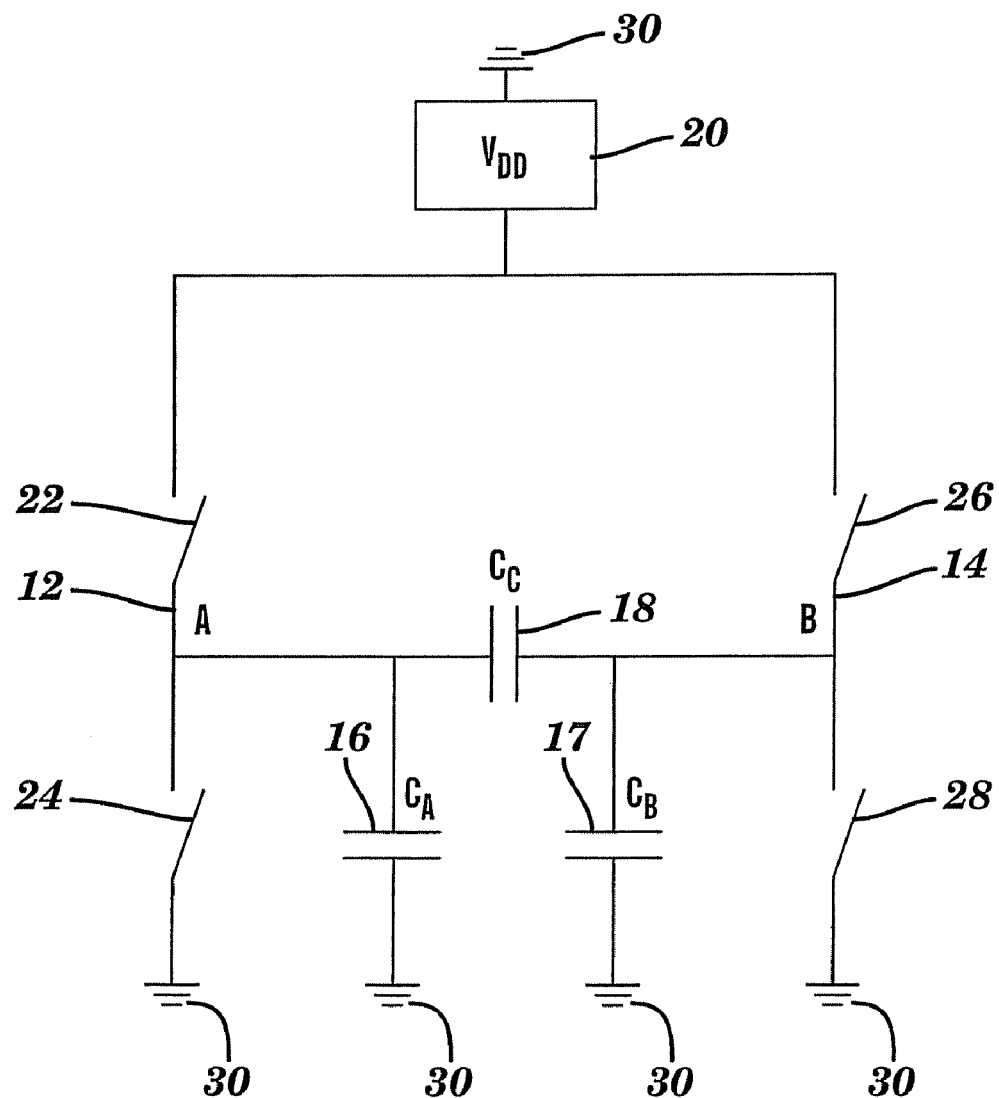
FIG. 1 depicts an electrical circuit having a first wire, a second wire, and a power supply, in accordance with embodiments of the present invention.

The dynamic power required to drive capacitance accounts for most of the power dissipated in modern Very Large Scale Integration (VLSI) circuits. The energy (E) stored in a capacitor having a capacitance (C) is:

$$E = CV^2/2 \tag{1}$$

where the capacitor is charged to a voltage (V) across its terminals. The energy E is dissipated when the capacitor is discharged through a resistance to ground, and an equal amount of energy is dissipated when the capacitor is charged through a resistive element. In the case of a rail-to-rail transition and a grounded (non-coupling) capacitance (e.g., device gate and wire capacitance to ground), the voltage V is the voltage value ($V_{DD}$) of the voltage supply of the chip. The energy E can be converted to an average power as:

$$P = F_{SW} E = F_{SW} C V_{DD}^2 / 2 \tag{2}$$

where P is average power and $F_{SW}$ is the average switching frequency of the transition. Although the signal will make two transitions (one rising and one falling) in each switching period, only the rising transition extracts power from the power supply, while the falling transition dissipates previously stored energy. Thus the factor of ½ remains in Equation (2). Exact power values are difficult to obtain because the switching frequency of logic wires in a digital system is difficult to predict. Typically the clock frequency ($F_{CLOCK}$) is known, and a probability ($\phi$) that a particular wire will make a transition in any given clock cycle can be determined through simulation or other means. Noting that $F_{SW}$ can be represented as $\phi F_{CLOCK}$, Equation (2) becomes:

$$P = \phi F_{CLOCK} C V_{DD}^2 / 2 \tag{3}$$

If coupling capacitance exists, a voltage change across the capacitor, and thus the energy required for the transition, depends on logic transitions occurring on adjacent wires. A logic transition is a transition between discrete logic states, such as between a high voltage state (representable as "1") and a low voltage state (representable as "0"). A need to compute the energy E required for the transition makes power prediction and optimization design difficult, since the logical transitions on adjacent wires must be correlated with those on the wire of interest. Rather than trying to compute the energy stored in the various capacitances before and after a transition, the required energy may be determined by examining the amount of current which must be sourced by the power supply to effect the transition.

As chip geometries have decreased in scale, wires have become narrower and spaced closer together, which has lead to an increase in the lateral or 'coupling' capacitance ($C_{COUPLING}$). Coupling capacitance is responsible for an increasing portion of the total load that must be switched to accomplish a logic transition. The coupling capacitance between two wires is directly proportional to their common run length ($L_{COMMON}$) and inversely proportional to their inter-wire spacing ($W_{SPACING}$); i.e.,:

$$C_{COUPLING} \propto L_{COMMON}/W_{SPACING} \tag{4}$$

At the same time that coupling capacitance is increasing, device gate sizes and wire widths have decreased due to scaling. The non-coupling capacitance ($C_{NON-COUPLING}$) due to a wire is proportional to the wire width ($W_{WIRE}$) and to the wire length ($L_{WIRE}$):

$$C_{NON-COUPLING} \propto L_{WIRE} W_{WIRE}$$

Although reducing $W_{SPACING}$ between the two wires increases $C_{COUPLING}$, reducing $W_{SPACING}$ between the two wires decreases $C_{NON-COUPLING}$, because electric field lines which would otherwise terminate in other conductors (e.g., conductors in chip substrates) are diverted as $W_{SPACING}$ decreases to terminate in conductors (e.g., wires) to which the two wires are coupled.

FIG. 1 illustrates an electrical circuit having a wire 12 (denoted as "A"), a wire 14 (denoted as "B"), and a power supply 20 having a supply voltage $V_{DD}$, in accordance with embodiments of the present invention. For simplicity, $V_{DD}$ is assumed to be normalized to 1 volt. Nonetheless, the formulas, equations, and relationships presented herein under the assumption of $V_{DD}=1$ volt may be readily converted by one of ordinary skill in the art to accommodate the case of $V_{DD} \neq 1$ volt. Accordingly, such formulas, equations, and relationships for of $V_{DD} \neq 1$ volt are within the scope of the present invention.

In FIG. 1, the wire A has a capacitance of $C_A$, as represented by a capacitor 16. The wire B has a capacitance of $C_B$, as represented by a capacitor 17. A coupling capacitance $C_C$ between the wire A and the wire B is represented by a capacitor 18. There is a pull-up device 22, namely a switch, between the power supply 20 and the wire A, and a pull-down device 24, namely a switch, between the wire A and a ground 30. There is a pull-up device 26, namely a switch, between the power supply 20 and the wire B, and a pull-down device 28, namely a switch, between the wire B and the ground 30. The capacitors 16 and 17 are each coupled to the ground 30. FIG. 1 does not show series resistances through which the wires A and B are charged and discharged.

The wire A may be in a low-voltage state ("0") or a high-voltage state ("1"). The high voltage is actually $V_{DD}$, but $V_{DD}$ has been normalized to 1 volt, as stated supra. The pull-up device 22 and the pull-down device 24 control the states (0 and 1) of the wire A. A rising transition (from state 0 to state 1) occurs on the wire A when the pull-up device 22 for the wire A closes and the pull-down device 24 opens. A falling transition (from state 1 to state 0) occurs on the wire A when the pull-up device 22 for the wire A opens and the pull-down device 24 closes.

Similarly, the wire B may be in a low-voltage state ("0") or a high-voltage state ("1"). The pull-up device 26 and the pull-down device 28 control the states (0 and 1) of the wire B. A rising transition (from state 0 to state 1) occurs on the wire B when the pull-up device 26 for the wire B closes and the pull-down device 28 opens. A falling transition (from state 1 to state 0) occurs on the wire B when the pull-up device 26 for the wire B opens and the pull-down device 28 closes.

Figure 2:
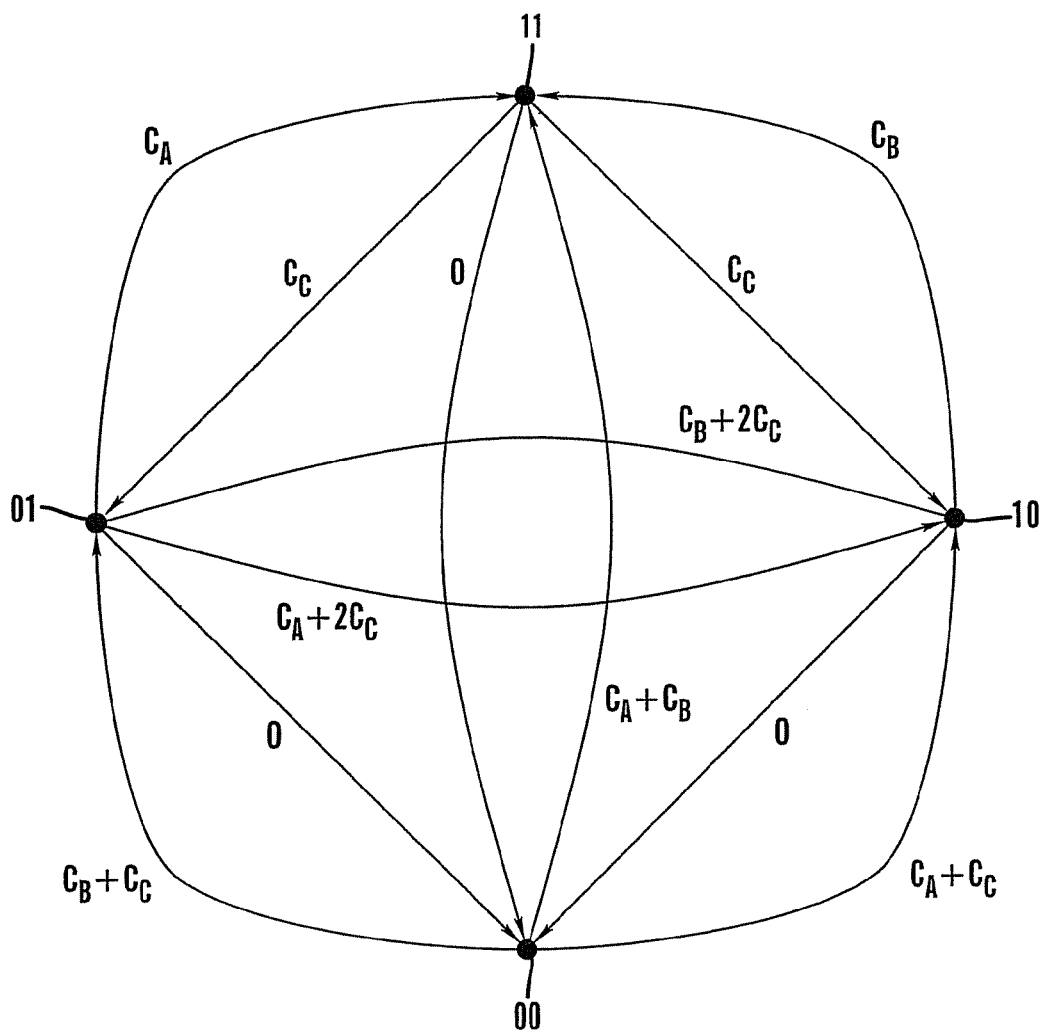
FIG. 2 depicts state transitions for the wires of FIG. 1 based on a two-state model for each wire, in accordance with embodiments of the present invention.

FIG. 2 illustrates state transitions for the wires A and B of FIG. 1 based on the two-state model (i.e., 0 and 1) for each wire, in accordance with embodiments of the present invention. In FIG. 2, four states of wire A and wire B ("AB" states) are depicted as follows with the following definitions and with $V_{DD}$ normalized to 1 volt:

| AB State | State of Wire A (Voltage) | State of Wire B (Voltage) |
|---|---|---|
| 00 | 0 | 0 |
| 01 | 0 | 1 |
| 10 | 1 | 0 |
| 11 | 1 | 1 |

FIG. 2 shows two types of state transitions between any two of the preceding four AB states. In the first type of state transition ("one-wire state transition"), either the wire A or the wire B, but not both, change its state (e.g., a 01→11 state transition in which only wire B changes its state). In the second type of state transition ("two-wire state transition"), both the wire A and the wire B change their state (e.g., a 01→10 state transition in which both wire A and wire B change state). Within the two-wire state transition category, there is same-direction switching (i.e., 00→11 and 11→00 state transitions) and opposite-direction switching (i.e., 01→10 and 10→01 state transitions).

Designations of same-direction switching and opposite-direction switching are expressed mathematically as follows. If the wire A transitions from a voltage state $V_{A1}$ to a voltage state $V_{A2}$, and if the wire B transitions from a voltage state $V_{B1}$ to a voltage state $V_{B2}$, then there is same-direction switching if $(V_{A2}-V_{A1})(V_{B2}-V_{B1})>0$; or opposite-direction switching if $(V_{A2}-V_{A1})(V_{B2}-V_{B1})<0$.

FIG. 2 further shows effective capacitances which must be charged by current sourced by the power supply 10 (see FIG. 1) for each such state transition. For example, FIG. 2 shows an effective capacitance of $C_A$ for the 01→11 state transition. The charge which must be supplied for each state transition is equal to the effective capacitance multiplied by $V_{DD}$. Since $V_{DD}$ has been normalized to 1 volt, the charge which must be supplied is numerically equal to the effective capacitance. The state transitions are assumed to occur simultaneously for "corner-to-corner" transitions in which both wires change (e.g., 00→11 state transition; 11→00 state transition).

Alternative effective capacitances may be assigned, since an amount of charge withdrawn from the power supply 10 for each transition would differ if capacitances $C_A$ and $C_B$ were capacitances to $V_{DD}$ rather than to ground. Nonetheless, the energy required for a series of transitions which start and end in the same state, and which traverse the same closed path or loop, will be the same for the effective capacitances shown in FIG. 2 and for the alternative effective capacitances. Thus the alternative effective capacitances may be used instead of the effective capacitances shown in FIG. 2, subjected to the constraint that the sum of such alternative effective capacitances over a distinct closed path or loop are the same as the sum of the effective capacitances shown in FIG. 2 over the distinct closed path or loop, for each such distinct closed path or loop. Given the effective capacitances shown in FIG. 2, one of ordinary skill in the art would be able to determine alternative effective capacitance in accordance with the above constraint of preserving the sum of the effective capacitances over each distinct closed path or loop. Thus, the scope of the present invention includes any distribution of alternative effective capacitances which relates to FIG. 2.

FIG. 2 shows that an AB state transition of 00→11 or 11→00 (i.e., same-direction switching) has a lower effective capacitance, and thus consumes less power, if the wires A and B transition simultaneously than if the wires A and B transition sequentially. For example, the simultaneous state transition 00→11 has an effective capacitance of $C_A+C_B$, while the sequential state transition 00→01→11 or 00→10→11 has an effective capacitance of $C_A+C_B+C_C$. Similarly, the simultaneous state transition 11→00 has an effective capacitance of 0, while the sequential state transition 11→01→00 or 11→10→00 has an effective capacitance of $C_C$. Thus, same-direction switching has an effective capacitance that is higher by $C_C$ for sequential transitioning as compared with simultaneous transitioning. Hence, simultaneous transitioning for same-direction switching decreases power dissipation by not having to charge the coupling capacitor.

FIG. 2 also shows that an AB state transition for of 01→10 or 10→01 (i.e., opposite-direction switching) has a higher effective capacitance, and thus consumes more power, if the wires A and B transition simultaneously than if the wires A and B transition sequentially. For example, the simultaneous state transition 01→10 has an effective capacitance of $C_A+2C_C$, while the sequential state transition 01→00→10 or 01→11→10 has an effective capacitance of $C_A+C_C$. Similarly, the simultaneous state transition 10→01 has an effective capacitance of $C_B+2C_C$, while the sequential state transition 10→00→01 or 10→11→01 has an effective capacitance of $C_B+C_C$. Thus, the state transition for an opposite-direction switching has an effective capacitance that is higher by $C_C$ for simultaneous transitioning as compared with sequential transitioning. Hence, simultaneous transitioning for opposite-direction switching increases power dissipation due to coupling capacitance.

The preceding discussion demonstrates that simultaneously performing the AB state transitions of 00→11 and 11→00 (i.e., same-direction switching) is power efficient as compared with sequentially performing the AB state transitions of 00→11 and 11→00. Unfortunately, it is hard to achieve the power savings of simultaneous same-direction transitions on coupled wires, because is difficult to intentionally align state transitions of signals. The difficulty is due to differences in path lengths in the logic driving the signals, uncontrollable process variations, and unpredictable variations in the electrical environment of the wires.

The present invention discloses use of tri-stating the wire B to simulate the mathematical effect of simultaneous transitions without actually performing simultaneous transitions, as will be demonstrated infra. Tri-stating allows a wire to be driven bi-directionally from several different points. In a tri-stated wire, each of the different driving points include a switchable control that enables one driver to be controlling the voltage at a time, while the other drivers are switched into a non-controlling high impedance state. If at any time none of the drivers are enabled, the tri-stated wire is said to be floating in a high impedance state. During this floating period, the charge, and therefore the voltage on the wire can be changed by current injected across coupling capacitance from adjacent nets. Appendix A discloses various techniques for tri-stating a wire.

For AB state transitions, the wire B is tri-stated before completing its transition. The AB state transition sequence includes: wire B is tri-stated; the wire A makes the wire A's transition; and the wire B completes the wire B's transition. The preceding steps are sequentially executed rather than simultaneously executed. Note that for the state transitions of 00→01, 01→00, 10→11, and 11→10, no new wire-A states are introduced.

The following timing consideration apply to the preceding sequence of transition of the wires A and B in the context of tri-stating the wire B. Assume that a clock cycle has a duration T, and consider time as being referenced to the beginning time (0) of the clock cycle. Also assume that a signal at wire A can begin a state transition no earlier than a time $t_{A1}$ and that the signal can complete the state transition no later than a time $t_{A2}$. Thus all state transitions on wire A must occur between $t_{A1}$ and $t_{A2}$ such that $$0 < t_{A1} < t_{A2} < T \quad (6)$$

The times $t_{A1}$ and $t_{A2}$ take into account all known time delays and tolerances for the wire A, and it is assumed that $t_{A1}$ and $t_{A2}$ are known for every such wire A. Thus, if the wire B is to transition from an initial B-state to a final B-state, then the wire B must be tri-stated from the initial B-state at a time between 0 and $t_{A1}$. Thus for determining whether the wire B can be tri-stated relative to the wire A, an assessment must be made as to whether the time interval $t_{A1}$ is enough time for the wire B to be tri-stated. If not, then the wire B cannot be tri-stated. Additionally for determining whether the wire B is can be tri-stated relative to the wire A, an assessment must be made as to whether the time interval $T-t_{A2}$ is enough time for the wire B to be transitioned from its tri-state to its final B-state and for the final B-state value to propagate through any subsequent logic changes to clocked storage elements (e.g., latches) in which results will be stored. If not, then the wire B cannot be tri-stated.

While the B wire is being tri-stated to simulate the mathematical effect of simultaneous state transitions, blocking functions are used to decouple the B wire from downstream logical circuits in order to prevent extraneous signal propagation from the B wire to the downstream logical circuits. If the wire B is to make a state transition from 0→1 or 1→0, then the B wire during tri-stating is at an intermediate voltage that differs from either 0 or 1 and may be indeterminate. Thus, decoupling the B wire from the downstream logical circuits prevents a signal at the indeterminate voltage from propagating to the downstream logical circuits. The entire AB state transition typically occurs during a clock cycle. Thus, the blocking functionality is time limited and must be turned off after the B wire has transitioned from its tri-state to its final state and before the next clock cycle begins. Appendix A presents additional information relating to blocking functionality.

As an example of tri-stating the wire B and referring to FIG. 1, if the wire B is making a state transition of 0→1, then the wire B is initially in the "0" state with the pull-up device 26 open and the pull-down device 28 closed. The wire B is tri-stated by opening the pull-down device 28. The wire B completes the wire B's transition by closing the pull-up device 26.

As another example of tri-stating the wire B, if the wire B is making a state transition of 1→0, then the wire B is initially in the "1" state with the pull-up device 26 closed and the pull-down device 28 open. The wire B is tri-stated by opening the pull-up device 26. The wire B completes the wire B's transition by closing the pull-down device 28.

When the wire B is tri-stated, the voltage level of the wire B can be expressed in terms of X, where X is given by:

$$X = C_C/(C_C + C_B) \quad (7)$$

Figure 3:
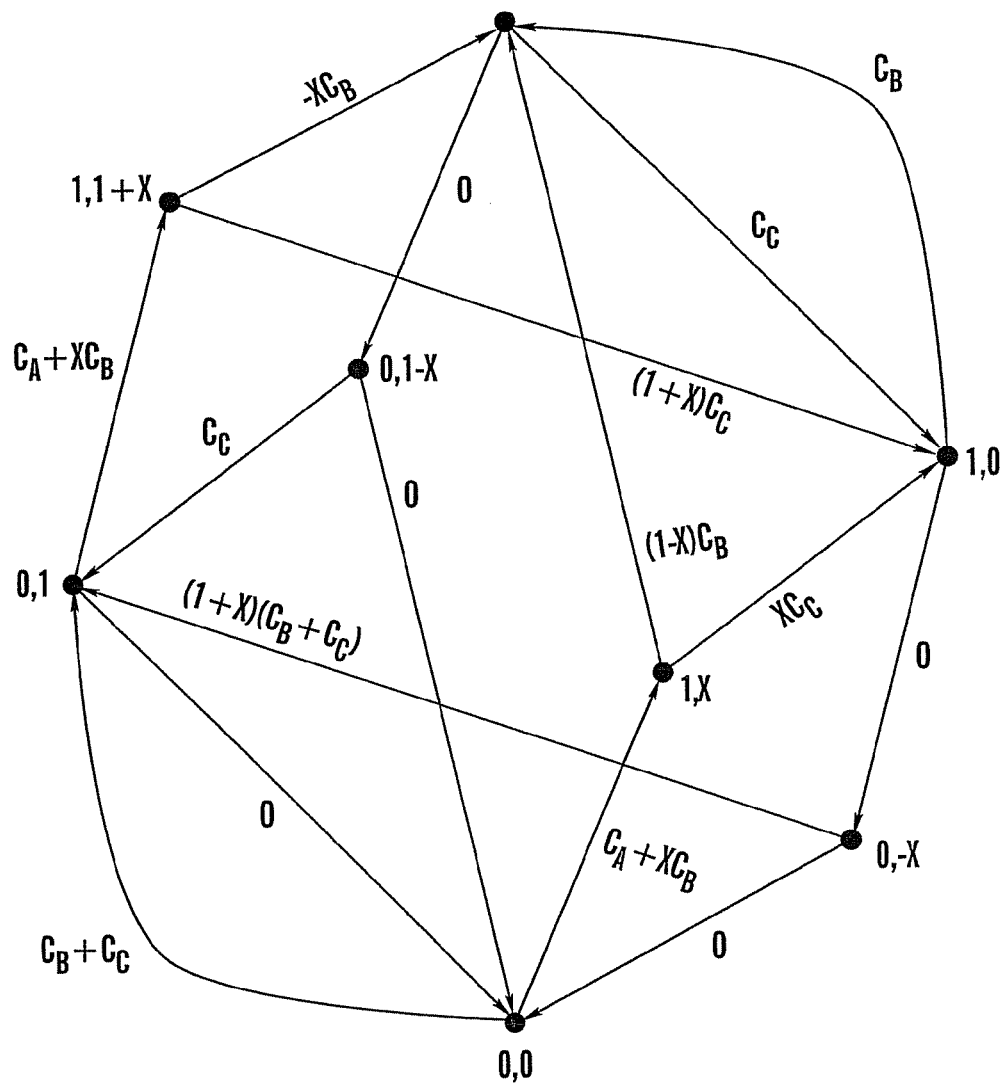
FIG. 3 depicts state transitions for the wires of FIG. 1 based on a two-state model for the first wire and a tri-state model for the second wire, in accordance with embodiments of the present invention.

FIG. 3 depicts state transitions for the wires A and B of FIG. 1 based on the two-state model (i.e., 0 and 1) for the wire A, and a tri-state model (i.e., 0, 1, and T) for the wire B, in accordance with embodiments of the present invention. T represents the state of the wire B when the wire B is tri-stated; i.e., when B is in a high-impedance state. Note that the discussion supra of alternative effective capacitance in relation to FIG. 2 applies similarly to FIG. 3

In FIG. 3, eight states of wire A and wire B ("AB" states) are depicted as follows while the wire B is being tri-stated with $V_{DD}$ normalized to 1 volt:

| AB State | State of Wire A (Voltage) | State of Wire B (Voltage) |
|---|---|---|
| 00 | 0 | 0 |
| 01 | 0 | 1 |
| 10 | 1 | 0 |
| 11 | 1 | 1 |
| 0, −X | 0 | −X |
| 0, 1 − X | 0 | 1 − X |
| 1, X | 1 | X |
| 1, 1 + X | 1 | 1 + X |

FIG. 3 shows four new states (0,−X; 0,1−X; 1,X; 1,1+X) relative to FIG. 2, corresponding to intermediate voltages to which the wire B is driven, due to capacitive coupling, while being tri-stated. FIG. 3 also shows state transitions between pairs of the preceding eight AB states. FIG. 3 further shows the effective capacitances which must be charged by current sourced by the power supply 10 (see FIG. 1) for each such state transition. For example, FIG. 3 shows an effective capacitance of $C_A + XC_B$ for the 00→, 1,X state transition. The charge which must be supplied for each state transition is equal to the effective capacitance multiplied by $V_{DD}$. Since $V_{DD}$ has been normalized to 1 volt, the charge which must be supplied is numerically equal to the effective capacitance.

With the tri-stating of B, the state transitions from the initial AB state to the final AB state are sequentially executed rather than simultaneously executed. Nonetheless, the effective capacitance $C_{TRI}$ with tri-stating after completion of all sequential steps is mathematically equivalent to the effective capacitance $C_{SIM}$ with simultaneous state transitions, as illustrated in the following four examples.

In the first example, the state transition is 00→11. From FIG. 2, $C_{SIM}(00→11) = C_A + C_B$. From FIG. 3, $C_{TRI}(00→11)$ is computed by sequential state transitions; i.e., $$C_{TRI}(00 \to 11) = C_{TRI}(00 \to 1, X) + C_{TRI}(1, X \to 11)$$
$$= C_A + XC_B + (1 - X)C_B$$
$$= C_A + C_B$$

In the second example, the state transition is 11→00. From FIG. 2, $C_{SIM}(11→00) = 0$. From FIG. 3, $C_{TRI}(11→00)$ is computed by sequential state transitions; i.e., $$C_{TRI}(11 \to 00) = C_{TRI}(11 \to 0, 1 - X) + C_{TRI}(0, 1 - X \to 00)$$
$$= 0 + 0$$
$$= 0$$

In the third example, the state transition is 01→10. From FIG. 2, $C_{SIM}(01→10) = C_A + 2C_C$. From FIG. 3 and using Equation (7) for X, $C_{TRI}(01→10)$ is computed by sequential state transitions; i.e., $$C_{TRI}(01 \to 10) = C_{TRI}(01 \to 1, 1 + X) + C_{TRI}(1, 1 + X \to 10)$$
$$= C_A + XC_B + (1 + X)C_C$$
$$= C_A + C_C + X(C_B + C_C)$$
$$= C_A + C_C + C_C$$
$$= C_A + 2C_C$$

In the fourth example, the state transition is 10→01. From FIG. 2, $C_{SIM}(10\rightarrow01)=C_B+2C_C$. From FIG. 3 and using Equation (7) for X, $C_{TRI}(10\rightarrow01)$ is computed by sequential state transitions; i.e., $$\begin{aligned}C_{TRI}(10 \rightarrow 01) &= C_{TRI}(10 \rightarrow 0, -X) + C_{TRI}(0, -X \rightarrow 01)\\ &= 0 + (1+X)(C_B + C_C)\\ &= C_B + C_C + X(C_B + C_C)\\ &= C_B + C_C + C_C\\ &= C_B + 2C_C\end{aligned}$$

The preceding examples illustrate the fact that tri-stating the B-wire simulates simultaneous state transitions. It should be understood that the simulation of simultaneous state transitions by tri-stating the B wire is a simulation of the mathematical effect of simultaneous state transitions and not a physical simulation. With the tri-stating of the B wire, the state transitions of the A wire and the B wire are sequentially performed and not simultaneously performed.

Thus, the present invention enables truly simultaneous state transitions to be simulated by sequential state transitions through tri-stating the B wire. Whereas truly simultaneous state transitions present significant practical difficulties as explained supra, sequential state transitions including tri-stating the B wire are practical with existing technology. As stated supra, Appendix A discloses various techniques for tri-stating a wire.

To summarize, although simultaneous transitioning for same-direction switching (i.e., state transitions 00→11 and 11→00) eliminates power dissipation associated with coupling capacitance, such simultaneous transitioning is extremely difficult to implement. Nonetheless, a tri-stating of the wire B may be used to simulate the mathematical effect of simultaneous transitioning and thus achieve the benefit of simultaneous transitioning. Consequently, a tri-stating of the wire B may be used for same-direction switching to eliminate power dissipation associated with coupling capacitance.

Since power dissipation is typically estimated as the average power dissipated over all transitions on a chip simultaneously, the absolute prediction accuracy of the power due to a single transition on a coupling capacitance is not critical. Thus, the present invention considers the probability of each possible state transition which may occur in any given machine cycle, in order to evaluate the potential saving in power of each transition in relation to the average power dissipated over all transitions. The present invention provides a capability of reducing average power dissipation while at the same time reducing the amount of over-design necessary.

While simultaneous transitioning reduces power dissipation for same-direction switching, simultaneous transitioning increases power dissipation for opposite-direction switching. Hence, tri-stating of the B wire to simulate simultaneous transitions must be selectively employed in order to reduces power dissipation. Given the wires A and B, whether tri-stating the B wire will reduce power dissipation depends on the relative probabilities of the various state transition which can occur during a clock cycle. In particular, tri-stating will potentially reduce power dissipation if the probability of same-direction switching ($\phi_{SD}$) exceeds the probability of opposite-direction switching ($\phi_{OD}$) in a clock cycle for the wires A and B. Tri-stating is most effective if $$\phi_{SD} \geq \phi_{SD,MIN} \tag{8}$$

wherein $\phi_{SD,MIN}$ is a predetermined or user-selected value such as, inter alia, 0.60, 0.70, 0.80, 0.90, etc. Note that $\phi_{SD,MIN}$ is application dependent. In the context of computer software which implements the algorithm inherent in FIG. 4, an example of a "predetermined" value is a value that is encoded or hard-wired into the computer software, and an example of a "user-selected" value is a value that a user of the computer software provides as input to the computer software. The phrase "pre-determined or user-selected." may be generally replaced herein for brevity by the phrase "pre-selected."

If $\phi_{OD}$ exceeds $\phi_{SD}$, then the power reduction benefit of tri-stating is potentially realizable by utilizing "inverted tri-stating," which combines tri-stating with an inversion of the B wire ("B-inversion"). The B-inversion converts opposite-direction switching into same-direction switching as follows. Consider the A wire and the B wire as having a common run length and being spaced closely together along the common run length. There is a B-inversion from a beginning location of the common run length to an ending location of the common run length. At the beginning location of the common run length, a voltage B1 on the B wire is inverted from B1 to NOT B1. At the ending location of the common run length, a voltage B2 on the B wire is inverted from B2 to NOT B2. The B-inversion effectively interchanges $\phi_{SD}$ $_{and}$ $\phi_{OD}$, which causes the A and B wires to engage in same-direction switching at a probability of $\phi_{OD}$ and opposite-direction switching at a probability of $\phi_{SD}$. Thus since $\phi_{OD}$ exceeds $\phi_{SD}$, the B-inversion converts a net power dissipation increase into a net power dissipation decrease when tri-stating is used Note that the B-inversion adds a cost in power due to using extra inverters at the beginning and ending locations of the common run length. This added cost in power is small and is likely to be outweighed by the reduction in power dissipation resulting from the application of tri-stating in accordance with the present invention. Whether to include inverted tri-stating depends on the power cost of the B-inversion and design constraints which may not permit the B-inversion. Thus, direct tri-stating is applicable to same-direction switching and inverted tri-stating may be beneficial for opposite-direction switching. Inverted tri-stating is most effective if $$\phi_{OD} \geq \phi_{OD,MIN} \tag{9}$$

wherein $\phi_{OD,MIN}$ is a pre-selected value such as, inter alia, 0.60, 0.70, 0.80, 0.90, etc. Note that $\phi_{OD,MIN}$ is application dependent.

It was indicated supra that the effective capacitance $C_{TRI}$ (01→10) with tri-stating and no B-inversion for the state transition 01→10 is $C_A+2C_C$. With inverted tri-stating, however, $C_{TRI}(01\rightarrow10)$ is instead the effective capacitance $C_A+C_B$ of the simultaneous state transition 00→11. Similarly, it was indicated supra that the effective capacitance $C_{TRI}(10\rightarrow01)$ with tri-stating and no B-inversion for the state transition 10→01 is $C_B+2C_C$. With inverted tri-stating, however, $C_{TRI}$ (10→01) is instead the effective capacitance zero of the simultaneous state transition 11→00.

The reduction in power dissipation resulting from direct tri-stating or inverted tri-stating of the B wire depends on the effective capacitance $C_C$ between the A wire and the B wire. Equation (4) shows that $C_C$ varies as a ratio of the common run length $L_{COMMON}$ to the inter wire spacing $W_{SPACING}$ of the wires A and B. Thus, the reduction in power dissipation $\Delta P$ resulting from direct tri-stating of the B wire varies according to $$\Delta P \propto (\phi_{SD} - \phi_{OD}) L_{COMMON}/W_{SPACING} \tag{10}$$

for the given pair of wires A and B. Similarly, the reduction in power dissipation resulting from inverted tri-stating of the B wire varies according to $$\Delta P \propto (\phi_{OD} - \phi_{SD}) L_{COMMON} / W_{SPACING} \quad (11)$$

for the given pair of wires A and B. In a chip, tri-stating of only a small percentage of wire pairs will significantly reduce power dissipation, since most wire pairs are spaced so far apart (i.e., $W_{SPACING}$ is so large) or have such a small common run length (i.e., $L_{COMMON}$) that their effect on power dissipation through coupling capacitance is negligible. Thus, tri-stating for reducing power dissipation associated with coupling capacitance should be selectively applied to wire pairs spaced closely apart, having a large common run length, and having a high probability of same-direction switching or opposite-direction switching.

Figure 4:
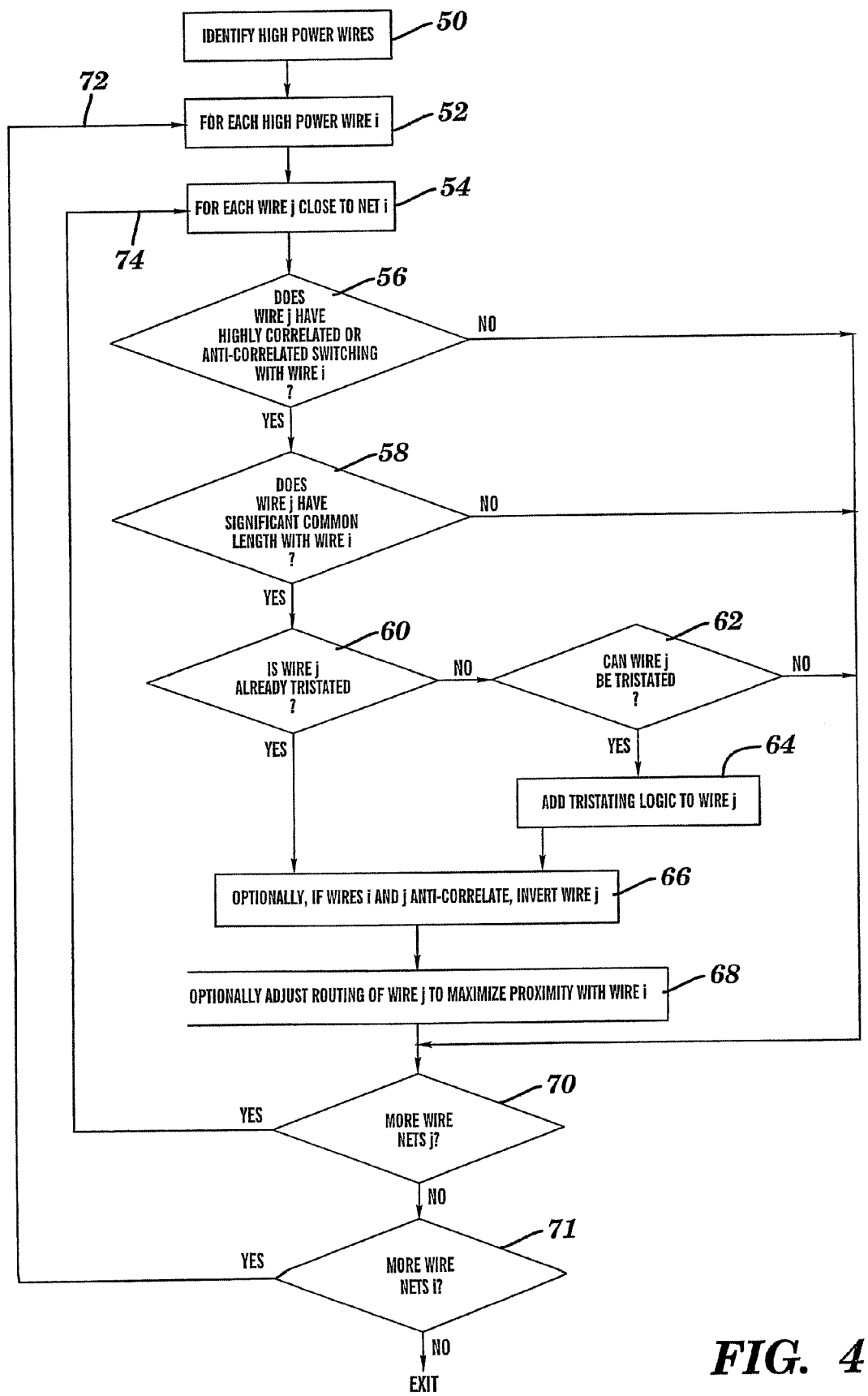
FIG. 4 is a flow chart which describes method steps for selecting wire pairs such that one wire of each wire pair is tri-stated in accordance with embodiments of the present invention.

Two embodiments for selecting wire pairs for tri-stating are considered herein. In the first embodiment, the physical design has been preset before tri-stating of the present invention is given consideration. Thus in the first embodiment, $L_{COMMON}$ and $W_{SPACING}$ are given as predetermined. In the second embodiment, the physical design is fluid such that $L_{COMMON}$ and $W_{SPACING}$ may be varied by circuit placement or rerouting in accordance with both physical design constraints and consideration of reducing power dissipation through tri-stating FIG. 4 is an algorithm which illustrates procedure steps associated with the first embodiment. In particular, FIG. 4 is a flow diagram of process steps for determining pairs of wires for tri-stating in accordance with the present invention, wherein the physical layout of the wires has been essentially established. FIG. 4 applies to a chip having N wires wherein N is at least 2. Step 50 in FIG. 4 identifies I high-power wires ($2 \leq I \leq N$) of the N wires which can potentially save the most power by being paired with "good neighbor" wires. The high-power wires have a high probability $\phi$ of being switched within a machine cycle and have large wire length $L_{WIRE}$. While a high value of $\phi$ does not guarantee a high value of same-direction switching probability $\phi_{SD}$, or of a high opposite-direction switching probability $\phi_{OD}$, when the high-power wire candidate is paired with another wire, a low value $\phi$ does guarantee low values of $\phi_{SD}$ and $\phi_{OD}$. Similarly, while a high value of $L_{WIRE}$ does not guarantee a high common run length $L_{COMMON}$ when the high-power wire candidate is paired with another wire, a low value $L_{WIRE}$ does guarantee low values of $L_{COMMON}$. Thus, the I high-power wires are selected from the N wires in step 50 such that each high-power wire satisfies $$\phi \geq \phi_{MIN} \quad (12)$$

and $$L_{WIRE} \geq L_{WIRE,MIN} \quad (13)$$

wherein $\phi_{MIN}$ is a pre-selected minimum switching probability per clock cycle, and wherein $L_{WIRE,MIN}$ is a pre-selected minimum wire length. Note that $\phi_{MIN}$ and $L_{WIRE,MIN}$ are application dependent. Thus a "high-power wire" is defined herein as a wire whose probability $\phi$ of being switched within a machine cycle satisfies Equation (12) and whose wire length $L_{WIRE}$ satisfies Equation (13).

Step 52 establishes an outer loop for attempting to find good neighbor wires for each high-power wire i (i=1, 2, . . . I). Thus step 52 fixes i for each outer loop iteration.

Step 54 initiates an inner loop which indexes wires j to determine if the wire j is a good neighbor of the wire i. Thus step 54 fixes j and increments j at each such inner iteration. The wires j are wires of the N wires which do not include the wire i. Thus the wires j which are candidates for being good neighbors of the wire i are sufficiently close to the wire i; i.e. the inter-wire spacing $W_{SPACING}$ between the wire i and the wire j must satisfy $$W_{SPACING} \leq WSPACING,MAX \quad (14)$$

wherein $W_{SPACING,MAX}$ is a pre-selected minimum inter-wire spacing. Note that $W_{SPACING,MAX}$ is application dependent.

Step 56 tests whether the wires i and j have a high same-direction switching probability $\phi_{SD}$ or a high opposite-direction switching probability $\phi_{OD}$; i.e., either Equation (8) for $\phi_{SD}$ or Equation (9) for $\phi_{OD}$ must be satisfied in order to proceed to step 58. If Equation (8) and Equation (9) are both not satisfied, then the wire j is not a good neighbor of the wire i and the procedure enters the next inner loop iteration at step 54 through path 74 if there are more wire nets j to be tested (see step 70), or to the next outer loop iteration at step 52 through path 72 if there are no more wire nets j to be tested but there remain wire nets i to be selected (see step 72).

Step 58 tests whether the wires i and j have a sufficiently large common run length $L_{COMMON}$; i.e., the condition $$L_{COMMON} \geq L_{COMMON,MIN} \quad (15)$$

must be satisfied, wherein $L_{COMMON,MIN}$ is a pre-selected minimum common run length. Note that $L_{COMMON,MIN}$ is application dependent. $L_{COMMON}$ can be determined by, inter alia, identifying whether the wires i and j share the same global wire channels, or overlap in a parallel or near-parallel fashion along a common path, for a significant distance. Equation (15) for $L_{COMMON}$ must be satisfied in order to proceed to step 60. If Equation (15) is not satisfied, then the wire j is not a good neighbor of the wire i and the procedure enters the next inner loop iteration at step 54 through path 74 if there are more wire nets j to be tested (see step 70), or to the next outer loop iteration at step 52 through path 72 if there are no more wire nets j to be tested but there remain wire nets i to be selected (see step 71).

Step 60 tests whether the wire j is already tri-stated during the state transition of the wire i; i.e., whether tri-stating logic has already been provided for the wire j. If so, proceed to step 66; if not, proceed to step 62. Step 58 considers that the wire j may already be tri-stated during a portion of the clock cycle.

Step 62 tests whether the wire j can be tri-stated, inasmuch as design constraints may not allow the wire j to be tri-stated. Generally, the wire j can be tri-stated unless the wire j cannot be tri-stated. For example and considering the wire i as representing the wire A in Equation (6), the wire j cannot be tri-stated if the tri-stating cannot meet the timing requirements associated with Equation (6); i.e., if tri-stating of the wire j cannot be accomplished before the time $t_{A1}$ or if there is insufficient time to transition the wire j from its tri-state to its final state. As another example, the wire j cannot be tri-stated if the cost or expense of tri-stating outweighs the power reduction due to the tri-stating. The specific criteria used for determining whether the wire j can or cannot be tri-stated is application dependent.

If the wire j can be tri-stated, proceed to step 64 which adds tri-stating logic to the wire j, and then proceed to step 66. If the wire j cannot be tri-stated, then the procedure enters the next inner loop iteration at step 54 through path 74 if there are more wire nets j to be tested (see step 70), or to the next outer loop iteration at step 52 through path 72 if there are no more wire nets j to be tested but there remain wire nets i to be selected (see step 71). Step 62 considers that a signal (generally a clock) is available at both the source and sink of the wire j such that the signal can tri-state the wire j and block intermediate voltage propagation at the sink of the wire j. As explained supra, the end of the tri-stating and blocking period must occur before the required arrival time (RAT) on the wire i, so that the tri-stating of the wire j does not introduce a timing problem. The switching window of the wire i (i.e., the period between the early and late mode arrival times of the wire i) should fall within the tri-stating period of the wire j.

Step 66 examines the result of step 56 as to whether the wires i and j have a high same-direction switching probability $\phi_{SD}$ or a high opposite-direction switching probability $\phi_{OD}$. If the wires i and j have a high same-direction switching probability $\phi_{SD}$, then the wire j is paired with the wire i as a good neighbor to the wire i and the procedure proceeds to step 68. If the wires i and j have a high opposite-direction switching probability $\phi_{OD}$, then inversion tri-stating of the wire j may or may not be permitted, since inversion tri-stating is optional. Inversion tri-stating of the wire j may not be permitted, for example, if the cost of inversion tri-stating of the wire j outweighs the power dissipation savings due to the inversion tri-stating. As another example, inversion tri-stating of the wire j may not be able to meet the timing requirements associated with Equation (6). Thus, if the wires i and j have a high opposite-direction switching probability and inversion tri-stating is permitted for the wire j, then step 66 adds inversion tri-stating logic for the wire j and the wire j is paired with the wire i as a good neighbor to the wire i; then the procedure proceeds to step 68. If the wires i and j have a high opposite-direction switching probability and if inversion tri-stating is not permitted for the wire j, then the wire j is not a good neighbor of the wire i and the procedure enters the next inner loop iteration at step 54 through path 74 if there are more wire nets j to be tested (see step 70), or to the next outer loop iteration at step 52 through path 72 if there are no more wire nets j to be tested but there remain wire nets i to be selected (see step 71).

Step 68 is entered after step 66 determines that the wire j is a good neighbor to the wire i. Although $W_{SPACING}$ satisfies Equation (14), the step 68 attempts to move the wire j closer to the wire i, as permitted by physical design constraints, so as to minimize $W_{SPACING}$ for as long of the common run length $L_{COMMON}$ as possible, in order to increase the power dissipation reduction $\Delta P$ in light of Equation (10) or Equation (11). Decreasing $W_{SPACING}$ increases coupling capacitance between the wires i and j while decreasing non-coupling capacitance between the wires i and j, because electric field lines which would otherwise terminate in other conductors (e.g., conductors in chip substrates) are diverted as $W_{SPACING}$ decreases to terminate in conductors (e.g., wires) to which the wires i and j are coupled. Step 68 is not a required step, since all of the criteria for tri-stating the wire j have been satisfied prior to step 68. Moving the wire j in step 68 may not be viable because of design constraints, or may be of little value if $W_{SPACING}$ can be reduced by only a small amount. On the other hand, moving the wire j in step 68 may result in a significant reduction in $W_{SPACING}$ and may thus be worth doing.

If after step 68, and in accordance with step 70, there are more wires j to be tested in the inner loop, then the procedure enters the next inner loop iteration at step 54 through logical path 74. If after step 68, and in accordance with step 70, there are no more wires j to be tested in the inner loop, then the procedure enters step 71 for testing whether there are any more wires i to be selected.

If step 71 is executed and determines that there are more wires i to be selected, then the procedure enters the next outer loop iteration at step 52 through logical path 72. If step 71 is executed and determines that there are no more wires i to be selected, then the procedure exits.

For each high-power wire i, the inner loop of FIG. 4 finds J good neighbor wires of the wire i. If no such good neighbors of the wire i exist, then J=0. If at least one such good neighbor of the wire i exists, then J>0. Thus, the inner loop of FIG. 4 finds at least zero good neighbor wires of each high-power wire i, which covers the case of J=0 and the case of J>0.

Although FIG. 4 shows particular steps in a particular sequence, any variation of FIG. 4 that would be apparent to one of ordinary skill in the art is within the scope of the present invention. For example, the steps 56 and 58 could be reversed in sequence.

A variation of FIG. 4 replaces the high-power wires derived from step 50 by all N wires; i.e., the outer loop index i goes from 1 to N instead of from 1 to I. This first variation recognizes that with a high-speed computer to implement the algorithm of FIG. 4, it may not be necessary to selectively filter the wires as in step 50. This variation of FIG. 4, tests every pair of wires within the N wires for determining good neighbor combinations and recognizes that two particular wires could have a high coupling capacitance and a high probability of switching in the same direction or in opposite directions, even though neither of the two particular wires technically qualify as a high-power wire.

Another variation of FIG. 4 combines steps 54 and 58 into a single test requiring the wires i and j to satisfy the following condition (16) in order to proceed to step 60:

$$F_{LW} \geq F_{LW,MIN} \qquad (16)$$

wherein $F_{LW}$ is defined as:

$$F_{LW} = L_{COMMON}/W_{SPACING} \qquad (17)$$

and wherein $F_{LW,MIN}$ is a pre-selected minimum value of $F_{LW}$. This variation based on Equation (16) and (17) requires that step 56 be executed, which necessitates that Equation (8) or Equation (9) be satisfied.

The preceding discussion disclosed two embodiments of the algorithm of FIG. 4, wherein each of the two embodiments included satisfying at least one mathematical relationship involving $L_{COMMON}$ and $W_{SPACING}$. In one of the two embodiments, the at least one mathematical relationship comprised Equations (14) and (15). In the other of the two embodiments, the at least one mathematical relationship comprised Equations (16) and (17). Generally for the present invention, the at least one mathematical relationship involving includes any set of mathematical relationships involving $L_{COMMON}$ and $W_{SPACING}$. For example, considerations of power savings relating to coupling capacitance may be overweighted or underweighted against other design considerations in determining wire pairing. If coupling capacitance is to be overweighted, then the at least one mathematical relationship may include a dependence on $(L^{COMMON}/W_{SPACING})^P$ wherein P>1 (e.g., P=2). If coupling capacitance is to be underweighted, then the at least one mathematical relationship may include a dependence on $(L_{COMMON}/W_{SPACING})^P$ wherein P<1 (e.g., P=½). Generally, the at least one mathematical relationship involving $L_{COMMON}$ and $W_{SPACING}$ is application dependent.

Aside from step 68 which permits minor variations in the physical layout, the methodology of FIG. 4, described supra, relates to first embodiments of the present invention which assumes that the physical design has been established before tri-stating of the present invention is considered, and that $L_{COMMON}$ and $W_{SPACING}$ are given as predetermined. Nonetheless with some modifications, FIG. 4 could be used to describe second embodiments of the present invention which assume that the physical design is fluid such that $W_{SPACING}$ may be varied by circuit placement or rerouting, in accordance with both physical design constraints and consideration of reducing power dissipation through tri-stating.

In the second embodiments, the placement of the wires are fluid and wires can be moved. For the second embodiments, step 54 in FIG. 4 is modified to eliminate the requirement that the wire j be close to the wire i; i.e. Equation (14) is not considered in step 54. Thus, step 54 does not exclude a wire j that is not close enough to the wire i to satisfy Equation (14). Step 54 functions primarily to set and update the wire index j. Additionally, step 58 is eliminated since it may be possible to move or reroute wire j if necessary to achieve a common run length with wire i that satisfies Equation (15). When step 68 is entered, it has not yet been determined whether the wire j is a good neighbor of the wire i. Accordingly, step 68 is modified to determine whether the wire j is positioned close enough to the wire i to satisfy Equation (14) or can be moved close enough to the wire i to satisfy Equation (14), and whether the wire j has a common run length that satisfies Equation (15) or could be moved and realigned such that Equation (15) is satisfied. If Equations (14) and (15) could be satisfied without violating other design constraints, then the wire j is a good neighbor of the wire i, or is made a good neighbor of the wire i by being moved, aligned, or otherwise rerouted. If not, then the wire j is not a good neighbor of the wire i. Whether the wire j can be moved, aligned, or rerouted relative to the wire i to satisfy Equations (14) and (15) includes consideration of physical design constraints as well as consideration of costs associated with the changed location of the wire j and costs associated with tri-stating and blocking the wire j.

The second embodiments differs fundamentally from the first embodiments, as described by FIG. 4. In the first embodiments, only those wires j which are initially close to the wire i (i.e., those wires j which initially satisfy Equation (14)) can be a good neighbor of the wire i, and such good-neighbor wires j can be moved a little closer to the wire i in accordance with the step 68. With the first embodiments, power savings due to the present invention is limited by the initial wire placements, and wire pairs which are initially spaced too far apart cannot be repositioned closely together for tri-stating application even if some of said wire pairs have sufficiently high same-direction or opposite-direction switching probabilities, and sufficiently large common run wiring lengths, to otherwise beneficially reduce the overall power dissipation in the chip.

In the second embodiments, any wire j can be a good neighbor of the wire i, regardless of the initial placement of the wire j, provided that physical placement and design constraints do not prevent the wire j from being subsequently moved close enough to the wire i to satisfy Equation (14). Additionally, for the wire j to be a good neighbor of the wire i, the procedure must be able to advance to step 68 based on satisfying the requirements of steps 56, 58, 60, and 66 (i.e., the requirements of high same-direction or opposite-direction switching probabilities, large common run wiring lengths, etc., must be satisfied). With the second embodiments, power savings due to the present invention is not limited by the initial wire placements, and wire pairs which are initially spaced too far apart can be subsequently repositioned closely together for tri-stating application of the present invention. Thus with the second embodiments, the physical layout or design is not preset. Physical placement decisions and the logical design could be made in consideration of each other. Logical decisions relating to power savings of the present invention could be made based on physical placements of wires, and physical placement decisions could be based on logical placement of wires. The physical placement considerations include both technical considerations and cost considerations. Accordingly, the step 68 weighs the effect of costs, and other physical constraints of placing the wire j close to the wire i, against the power savings that would be obtained by tri-stating the wire j when placed near the wire i. Thus, the second embodiments of the present invention permit the logical design and the physical design to evolve in concert.

The first embodiments and second embodiments are particularly distinguished by the meaning of the wire spacing $W_{SPACING}$ between the wire i and the wire j, and the common run length $L_{COMMON}$ between the wire i and the wire j. In the first embodiments, $W_{SPACING}$ is a predetermined wire spacing and $L_{COMMON}$ is a predetermined common run length. As applied to $W_{SPACING}$ and $L_{COMMON}$, "predetermined" means pre-established prior to implementation of the wire-pairing procedure (e.g., the wire-pairing procedure of FIG. 4). In the second embodiments, $W_{SPACING}$ is an established wire spacing and $L_{COMMON}$ is an established common run length. As applied to $W_{SPACING}$ and $L_{COMMON}$, "established" means changed in accordance with the second embodiments or predetermined because the pre-established values (of $W_{SPACING}$ and/or $L_{COMMON}$) are optimum or near-optimum without having to be changed.

Figure 5:
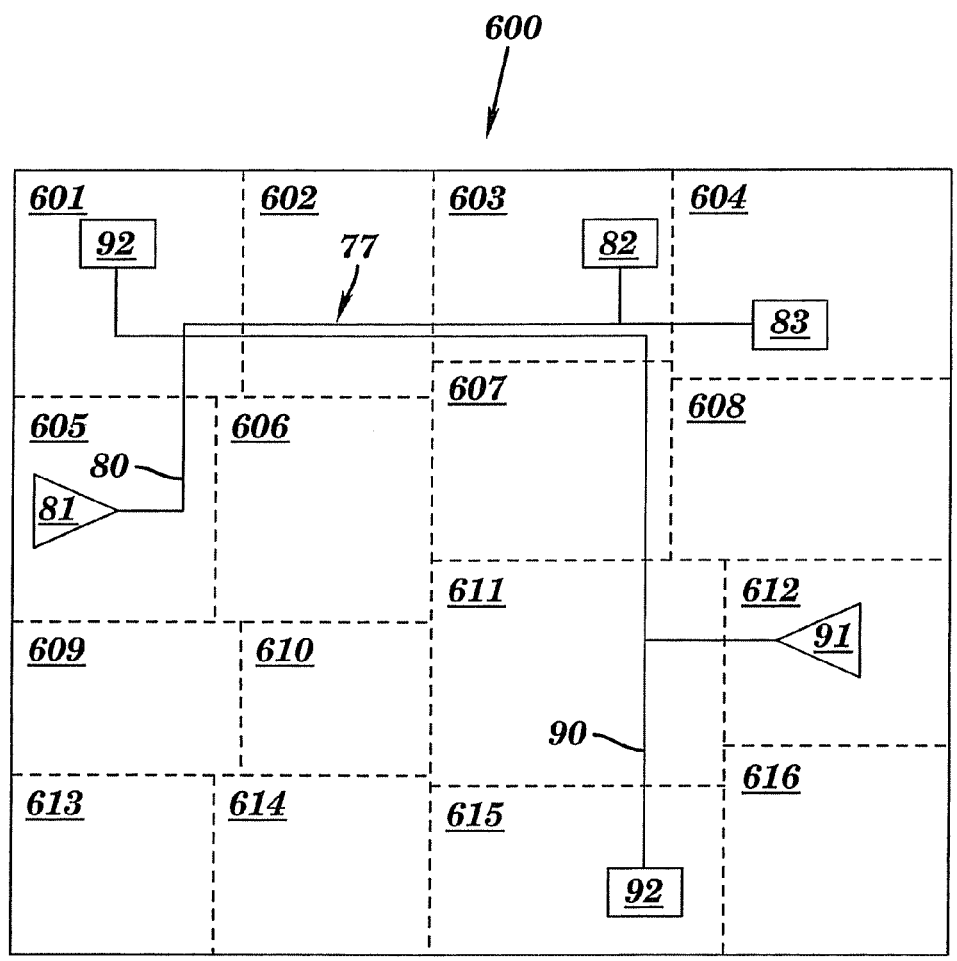
FIG. 5 depicts a chip layout showing placements of a wire pair such that a wire of the wire pair is tri-stated in accordance with embodiments of the present invention.

FIG. 5 shows a chip 600 divided into "bins" 601-616, after the inventive method has been applied and tri-stating and blocking circuits have been added. FIG. 5 illustrates how physical and logical placement of wires may be implemented in accordance with the second embodiments of the present invention. The bin environment of the chip 600 allows logical changes to a wire network to be made during physical placement of wiring. The bins 601-616 have been generated by a cut-based placement program and a set of operations to be performed between cuts. The cut-based placement program recursively divides the chip 600 area and the circuits on the chip 600. The cut-based placement program starts by dividing the chip 600 in two (though quadrisection methods which divide the chip 600 into four parts are also known). Then each of these halves are divided in two, and so on. Initially, nothing is known about the eventual location of circuits on the chip 600. After each set of cuts, the circuit locations are refined. The regions into which the chip 600 has been divided at any point in the placement process will be referred to as "bins". In this method, various "logic synthesis" actions (i.e., generally any actions which modifies the wiring) are performed between sets of placement cuts, which allows modifications to be made to the wiring network based on the refined knowledge of circuit placement now available. Typical actions include buffering, cloning (duplicating a circuit and distributing its fanout between the original circuit and the copy), factoring, pin swapping, etc. Occasionally circuits are also moved between bins.

The current invention can be implemented in the bin environment of FIG. 5 by identifying pairs of potentially good neighboring wires for application after the placement has progressed to the point where the bins are small enough that all intra-bin wires will be too short for beneficial application of the invention, but are still large enough to absorb the additional logic which may be introduced by the method.

FIG. 5 shows a wiring net 80 having a source 81, a sink 82, and a sink 83. FIG. 5 also shows a wiring net 90 having a source 91, a sink 92, and a sink 93. The wiring nets 80 and 90 are closely spaced apart along an overlapping run length 77. Such close spacing apart of the wiring nets 80 and 90 may have resulted from movement of either or both of the wiring nets 80 and 90 from initial placements in which the wiring nets 80 and 90 were spaced far apart. Either the wiring net 80 or the wiring net 90 may be tri-stated. For example, the wiring net 80 may be tri-stated if clock signals are available at the source 81 and at the sinks 82 and 83 such that the clock signals can tri-state the wiring net 80 and block intermediate voltage propagation at the sinks 82 and 83 of the wiring net 80.

The pairs of wires thus determined for either first embodiments or second embodiments may be ranked in accordance with power dissipation savings associated with each pair. Then a list of the pairs may be developed in descending or ascending order (or otherwise sorted order) of power dissipation savings. The list may be truncated at a point of diminishing returns in the power dissipation savings, in accordance with a predetermined truncation criterion. Any truncation criterion may be utilized. For example, the truncation criterion may attempt to balance the power dissipation savings against the cost and expense of tri-stating.

Even if tri-stating with the present invention does not save a significant amount of average power, the present invention may nevertheless be used to reduce peak power. The peak power reduction may be accomplished by avoiding having wiring nets close together, wherein such wiring nets are likely to switch simultaneously, and wherein the same-direction switching probability is not significantly different from the opposite-direction switching probability. Such wiring nets are therefore likely to consume higher power half the time (when they simultaneously switch in opposite directions), while saving power the other half of the time (when they switch in the same direction). By avoiding having such wiring nets spaced close together, the coupling capacitance contribution to the power peak is substantially reduced or eliminated.

Figure 6:
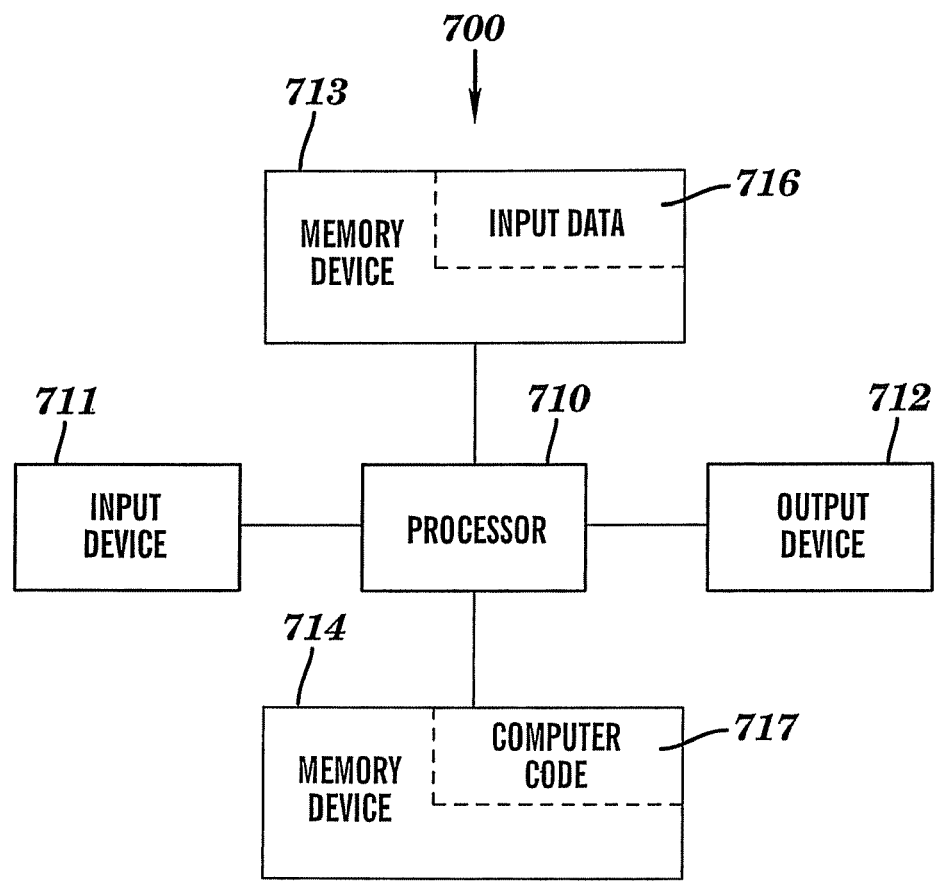
FIG. 6 depicts a computer system for selecting wire pairs such that one wire of each wire pair is tri-stated in accordance with embodiments of the present invention.

FIG. 6 depicts a computer system 700 for selecting wire pairs, in accordance with embodiments of the present invention. The computer system 700 comprises a processor 710, an input device 711 coupled to the processor 710, an output device 712 coupled to the processor 710, and memory devices 713 and 714 each coupled to the processor 710. The input device 711 may be, inter alia, a keyboard, a mouse, etc. The output device 712 may be, inter alia, a printer, a plotter, a computer screen, a magnetic tape, a removable hard disk, a floppy disk, etc. The memory devices 713 and 714 may be, inter alia, a hard disk, a dynamic random access memory (DRAM), a read-only memory (ROM), etc. The memory device 714 includes a computer code 717. The computer code 717 includes an algorithm for selecting wire pairs in accordance with the present invention as described herein. The processor 710 executes the computer code 717. The memory device 713 includes input data 716. The input data 716 includes input required by the computer code 717. The output device 712 displays output (such as pairs of wires selected) from the computer code 717.

While FIG. 6 shows the computer system 700 as a particular configuration of hardware and software, any configuration of hardware and software, as would be known to a person of ordinary skill in the art, may be utilized for the purposes stated supra in conjunction with the particular computer system 700 of FIG. 4. For example, the memory devices 713 and 714 may be portions of a single memory device rather than separate memory devices. As another example, the computer code 717 may be included within the memory device 713 instead of within the memory device 714.

While the description herein discussed wiring, and wiring transitions between voltage states, within a chip (e.g., a semiconductor chip), the scope of the present invention includes wiring, and wiring transitions between voltage states, within any electronic device or wiring structure.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

APPENDIX A: TRI-STATING A WIRE

Figure 7:
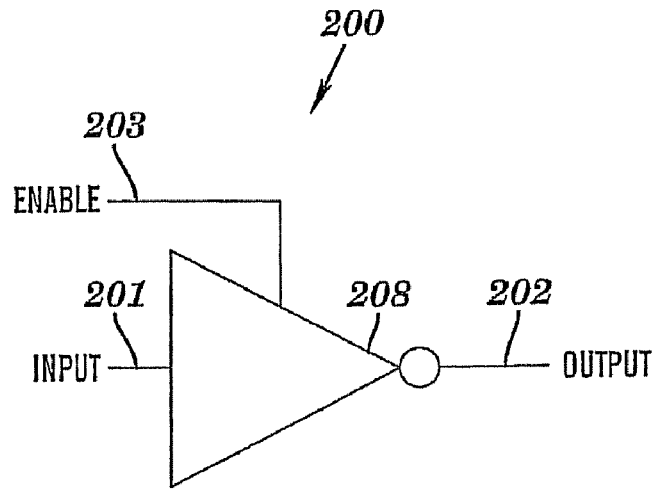
FIG. 7 depicts a tri-state driver, in accordance with embodiments of the present invention.
Figure 8:
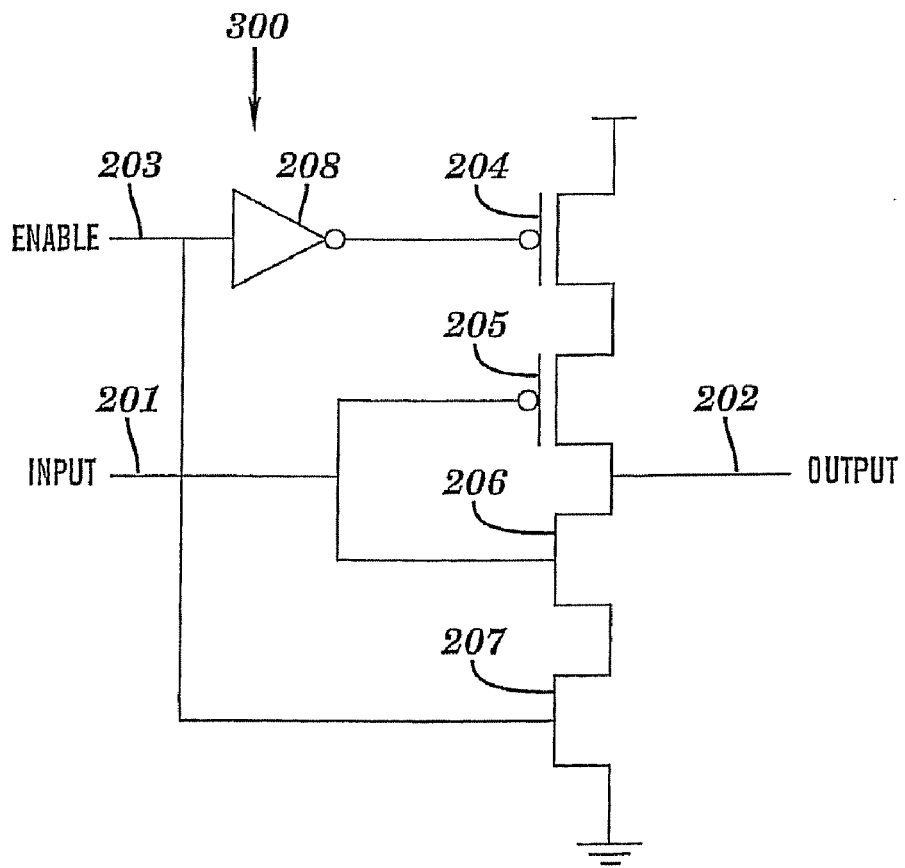
FIG. 8 depicts a tri-stating structure which implements the tri-state driver of FIG. 7.

Different methods can be used to tri-state a wire. Some methods involve inverting the signal. A simple method is a well-known tri-state driver 200 as shown in FIG. 7, which uses an inverter 208 to invert an input 201 and selectively place the output 202 in a high impedance state subject to the logic value of an enable signal 203. Implementation of such a tri-state driver 200 is shown in FIG. 8. FIG. 8 shows a tri-stating structure 300 which is a common static variant of a tri-state device. Transistors 204 and 205 are P-channel transistors. Transistors 206 and 207 are N-channel transistors. Input 201, output 202, and enable 203 are as in FIG. 7. If the enable signal is high, then the gate to P-channel transistor 204 would be ON and the N-channel transistor 207 would also be ON by virtue of the inversions between P-channel transistor 204 and the N-channel transistor 207. That would allow the input 201 to be presented to the P-channel transistor 205 and the N-channel transistor 206 and thus to control the pull-up and pull-down paths to the output, providing inversion from input to output. If the enable signal 203 were zero, then the P-channel transistor 204 would be HIGH and therefore OFF. Similarly, the enable line being low would turn off the N-channel transistor 207. In that case the value of the input would be unable to run on either the pull-up or pull-down paths to the output, even though it was presented to the P-channel transistor 205 and the N-channel transistor 206. Since the P-channel transistor 204 and the N-channel transistor 207 were OFF, the output signal would be indeterminate or floating. Thus there would be no path for the output signal to either $V_{DD}$ or ground, and any other signal could pull the output signal high or low.

Figure 9:
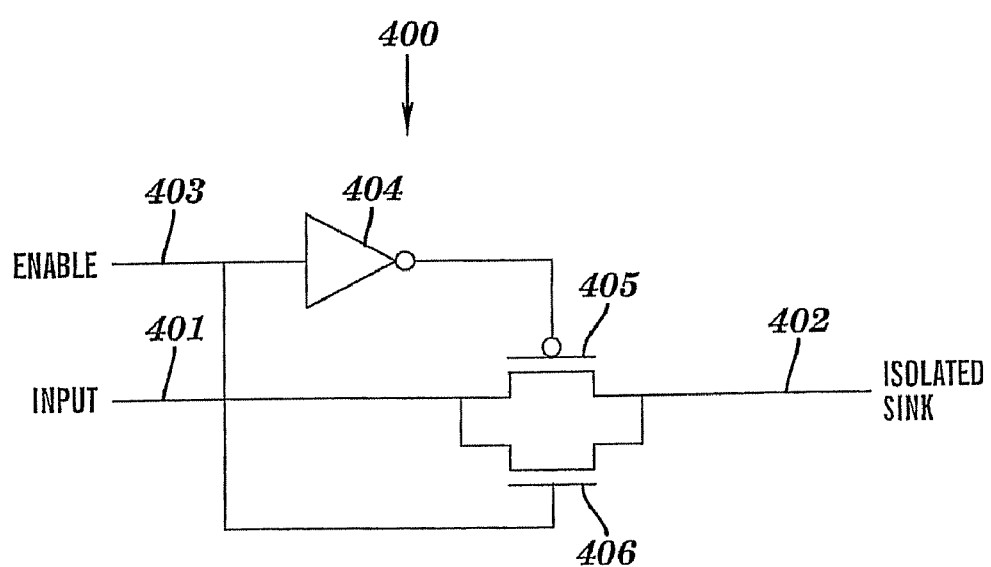
FIG. 9 depicts a tri-stating structure, in accordance with embodiments of the present invention.

If one needs to place a circuit in a high impedance state without signal inversion, pass-gate variants, or other topologies, can be used for tri-stating such as the tri-stating structure 400 of FIG. 9, which is a pass-gate variant. The tri-stating structure 400 includes an input 401, an output 402, an enable 403, an inverter 404, a P-channel transistor 405 and an N-channel transistor 406. The P-channel transistor 405 and the N-channel transistor 406 are in parallel. The tri-stating structure 400 of FIG. 9 is less desirable than the tri-stating structure 300 of FIG. 8, because the tri-stating structure 400 of FIG. 9 provides no signal gain, and therefore can deliver a slower, degraded signal to downstream sinks than can the tri-stating structure 300 of FIG. 8.

If a wire is to be put in a high impedance state, the state may float to an intermediate voltage due to leakage or noise or due to the intentional coupling upon which this invention is based, and care must be taken to ensure that the sink circuit doesn't dissipate excessive power under these conditions. Generally this requires a signal to be available at the sink location which can prevent propagation of potential intermediate voltage levels whenever the wire is in a high impedance state. This signal should be generated locally at the sink, since propagation of an additional control in parallel with the tri-stated wire would defeat the power savings objective. The simplest method to prevent unwanted propagation is to use a simple AND or OR gate, with the local signal controlling the gate whenever the wire is in a high impedance state. One can also use a latch, where the capturing clock edge (for an edge-triggered latch) or level (for a level-sensitive latch) is arranged to occur only when the wire is not tri-stated.

The circuitry required to tri-state a wire and to block propagation of intermediate logic values contributes its own overhead to the design, in area, circuit delay, and power. If a special tri-state control signal and/or a sink propagation blocking signal must be generated, that will also require additional overhead. Thus it is important to selectively apply the method only when the benefits exceed the costs. Typically a clock signal which is already being routed to the vicinities of both the driver and receiver will be used to tri-state the wire and to block propagation of intermediate voltages. This will require that there is sufficient time for the signal to propagate from the tri-stated driver after the end of the clock phase used to tri-state the wire. If gates are used to block signal propagation, one must also be careful to ensure that any additional switching due to the forcing the gate to a blocking state will have limited propagation and will not increase power excessively. For this reason a latch is the preferred circuit for blocking intermediate voltage propagation.

We claim:

1. An electrical wiring structure, comprising at least one wire pair, said wire pair including a first wire and a second wire, said second wire slated for being tri-stated, said wire pair having a same-direction switching probability $\phi_{SD}$ per clock cycle that is no less than a pre-selected minimum same-direction switching probability $\phi_{SD,MIN}$ or having an opposite-direction switching probability $\phi_{OD}$ per clock cycle that is no less than a pre-selected minimum opposite-direction switching probability $\phi_{OD,MIN}$, said first wire and said second wire satisfying at least one mathematical relationship, said at least one mathematical relationship involving $L_{COMMON}$ and $W_{SPACING}$, said $W_{SPACING}$ defined as a spacing between the first wire and the second wire, said $L_{COMMON}$ defined as a common run length of the first wire and the second wire.

2. The electrical wiring structure of claim 1, said at least one mathematical relationship comprising:
   $W_{SPACING}$ no greater than a pre-selected minimum spacing $W_{SPACING,MAX}$; and
   $L_{COMMON}$ no less than a pre-selected minimum common run length $L_{COMMON,MIN}$.

3. The electrical wiring structure of claim 1, said at least one mathematical relationship comprising $F_{LW} \geq F_{LW,MIN}$, said $F_{LW}$ defined as $L_{COMMON}/W_{SPACING}$, said $F_{LW,MIN}$ defined as a pre-selected minimum value of $F_{LW}$.

4. The electrical wiring structure of claim 1, wherein the first wire of the wire pair is a high-power wire, and wherein the second wire of the wire pair is a good neighbor wire of the high power wire.

5. The electrical wiring structure of claim 1, wherein $\phi_{OD}$ is no less than $\phi_{OD,MIN}$, and further comprising logic for inverting the second wire along the common run length.

6. The electrical wiring structure of claim 1, further comprising blocking logic for blocking propagation of a signal from the second wire while the second wire is tri-stated.

7. A computer system for designing an electrical wiring structure having a plurality of wires, comprising:
   a processor;
   an input device coupled to the processor;
   an output device coupled to the processor;
   a first memory device coupled to the processor;
   a second memory device coupled to the processor;
   a computer code stored in the second memory device and executed by the processor; said computer code comprising an algorithm, said algorithm identifying at least one wire pair, said wire pair including a first wire of the plurality of wires and a second wire of the plurality of wires, said second wire already tri-stated or configured to be tri-stated, said wire pair having a same-direction switching probability $\phi_{SD}$ per clock cycle that is no less than a pre-selected minimum same-direction switching probability $\phi_{SD,MIN}$ or having an opposite-direction switching probability $\phi_{OD}$ per clock cycle that is no less than a pre-selected minimum opposite-direction switching probability $\phi_{OD,MIN}$, said first wire and said second wire satisfying at least one mathematical relationship, said at least one mathematical relationship involving $L_{COMMON}$ and $W_{SPACING}$, said $W_{SPACING}$ defined as a spacing between the first wire and the second wire, said $L_{COMMON}$ defined as a common run length of the first wire and the second wire.

8. The computer system of claim 7, said at least one mathematical relationship comprising:
   $W_{SPACING}$ no greater than a pre-selected minimum spacing $W_{SPACING,MAX}$; and
   $L_{COMMON}$ no less than a pre-selected minimum common run length $L_{COMMON,MIN}$.

9. The computer system of claim 7, said at least one mathematical relationship comprising $F_{LW} \geq F_{LW,MIN}$, said $F_{LW}$ defined as $L_{COMMON}/W_{SPACING}$, said $F_{LW,MIN}$ defined as a pre-selected minimum value of $F_{LW}$.

10. The computer system of claim 7, wherein said algorithm identifying at least one wire pair includes:
    said algorithm identifying at least one high-power wire; and
    for a high-power wire of the at least one high-power wire, said algorithm identifying a good neighbor wire of the high-power wire, wherein the first wire of the wire pair is the high-power wire, and wherein the second wire of the wire pair is the good neighbor wire.

11. The computer system of claim 7, wherein if said algorithm determines that said second wire is not already tri-stated but is configured to be tri-stated, then further comprising said algorithm adding tri-stating logic to the second wire.

12. The computer system of claim 7, wherein if said algorithm determines that $\phi_{OD}$ is no less than $\phi_{OD,MIN}$, then further comprising said algorithm adding logic for inverting the second wire along the common run length.

13. The computer system of claim 7, further comprising the computer algorithm adding blocking logic for blocking propagation of a signal from the second wire while the second wire is tri-stated.

14. The computer system of claim 7, further comprising the computer algorithm reducing $W_{SPACING}$.

15. The computer system of claim 7, wherein if said the computer algorithm identifies the at least one wire pair as including a plurality of wire pairs, then further comprising:
    said computer algorithm ranking the wire pairs in accordance with power dissipation savings;
    said computer algorithm developing a list of the ranked wire pairs in sorted order of the power dissipation savings; and
    said computer algorithm truncating the list at a point of diminishing returns in the power dissipation savings, in accordance with a predetermined truncation criterion.

16. A computer program product, comprising: a computer usable medium having a computer readable program code embodied therein for designing an electrical wiring structure having a plurality of wires, wherein the computer readable program code includes an algorithm, said algorithm identifying at least one wire pair, said wire pair including a first wire of the plurality of wires and a second wire of the plurality of wires, said second wire already tri-stated or configured to be tri-stated, said wire pair having a same-direction switching probability $\phi_{SD}$ per clock cycle that is no less than a pre-selected minimum same-direction switching probability $\phi_{SD,MIN}$ or having an opposite-direction switching probability $\phi_{OD}$ per clock cycle that is no less than a pre-selected minimum opposite-direction switching probability $\phi_{OD,MIN}$, said first wire and said second wire satisfying at least one mathematical relationship, said at least one mathematical relationship involving $L_{COMMON}$ and $W_{SPACING}$, said $W_{SPACING}$ defined as a spacing between the first wire and the second wire, said $L_{COMMON}$ defined as a common run length of the first wire and the second wire.

17. The computer program product of claim 16, said at least one mathematical relationship comprising:

$W_{SPACING}$ no greater than a pre-selected minimum spacing $W_{SPACING,MAX}$; and $L_{COMMON}$ no less than a pre-selected minimum common run length $L_{COMMON,MIN}$.

18. The computer program product of claim 16, said at least one mathematical relationship comprising $F_{LW} \geq F_{LW,MIN}$, said $F_{LW}$ defined as $L_{COMMON}/W_{SPACING}$, said $F_{LW,MIN}$ defined as a pre-selected minimum value of $F_{LW}$.

19. The computer program product of claim 16, wherein said algorithm identifying at least one wire pair includes:

said algorithm identifying at least one high-power wire; and for a high-power wire of the at least one high-power wire, said algorithm identifying a good neighbor wire of the high-power wire, wherein the first wire of the wire pair is the high-power wire, and wherein the second wire of the wire pair is the good neighbor wire.

20. The computer program product of claim 16, wherein if said algorithm determines that said second wire is not already tri-stated but is configured to be tri-stated, then further comprising said algorithm adding tri-stating logic to the second wire.

21. The computer program product of claim 16, wherein if said algorithm determines that $\phi_{OD}$ is no less than $\phi_{OD,MIN}$, then further comprising said algorithm adding logic for inverting the second wire along the common run length.

22. The computer program product of claim 16, further comprising the computer algorithm adding blocking logic for blocking propagation of a signal from the second wire while the second wire is tri-stated.

23. The computer program product of claim 16, further comprising the computer algorithm reducing $W_{SPACING}$.

24. The computer program product of claim 16, wherein if said the computer algorithm identifies the at least one wire pair as including a plurality of wire pairs, then further comprising:

said computer algorithm ranking the wire pairs in accordance with power dissipation savings;

said computer algorithm developing a list of the ranked wire pairs in sorted order of the power dissipation savings; and said computer algorithm truncating the list at a point of diminishing returns in the power dissipation savings, in accordance with a predetermined truncation criterion.

* * * * *